(12) United States Patent
Deiana

(10) Patent No.: US 11,802,536 B1
(45) Date of Patent: Oct. 31, 2023

(54) WAVE TURBINE

(71) Applicant: Salvatore Deiana, Vancouver (CA)

(72) Inventor: Salvatore Deiana, Vancouver (CA)

( * ) Notice: Subject to any disclaimer, the term of this patent is extended or adjusted under 35 U.S.C. 154(b) by 0 days.

(21) Appl. No.: 18/177,574

(22) Filed: Mar. 2, 2023

Related U.S. Application Data

(60) Provisional application No. 63/351,678, filed on Jun. 13, 2022.

(51) Int. Cl.
*F03B 13/18* (2006.01)
*F03B 13/14* (2006.01)

(52) U.S. Cl.
CPC .......... *F03B 13/184* (2013.01); *F03B 13/145* (2013.01)

(58) Field of Classification Search
CPC ................ F03B 13/1825; F03B 13/183; F03B 13/1835; F03B 13/184
See application file for complete search history.

(56) References Cited

U.S. PATENT DOCUMENTS

| | | | | |
|---|---|---|---|---|
| 647,638 A * | 4/1900 | Todd | ................. | F03B 13/1815 |
| 2009/0146428 A1* | 6/2009 | Sack | ....................... | F03B 13/14 |
| | | | | 494/38 |
| 2011/0169266 A1* | 7/2011 | Song | ..................... | F03B 17/066 |
| | | | | 290/53 |
| 2011/0316280 A1* | 12/2011 | Khesali | ................... | F03B 17/02 |
| | | | | 290/53 |
| 2012/0131914 A1* | 5/2012 | Gibson | ................... | F03B 17/02 |
| | | | | 60/496 |
| 2020/0011286 A1* | 1/2020 | Najafian | ............... | F03B 17/063 |

* cited by examiner

*Primary Examiner* — Mickey H France
(74) *Attorney, Agent, or Firm* — Donald R. Boys; Central Coast Patent Agency LLC

(57) ABSTRACT

A wave driven electrical generating apparatus has a vertically oriented wheel having a plurality of buckets spaced around a periphery of the wheel, facing in a direction tangent to the wheel, a support structure supporting the wheel on a horizontal shaft, and a generator connected to the shaft such that motion of the wheel turns the generator. The electrical generating apparatus is anchored, immersed in water in a location having wave activity, wherein the wave activity drives the wheel to create torque to drive the generator to generate electricity.

6 Claims, 5 Drawing Sheets

WAVE TURBINE

CROSS-REFERENCE TO RELATED APPLICATIONS

The present case claims priority to provisional patent application 63/351,678, filed Jun. 13, 2022. All disclosure of the parent case is incorporated at least by reference.

BACKGROUND OF THE INVENTION

1. Field of the Invention

The present invention is in the technical field of electricity generation and pertains more particularly to methods and apparatus for generating electricity from wave motion.

2. Description of Related Art

It is well known that electric generation by burning fossil fuels releases carbon into the Earth's atmosphere in gaseous forms. This circumstance, along with other situations releasing carbon into the atmosphere has resulted in demonstrable global warming.

It is also well known that to reduce or eliminate global warming it is necessary to generate electricity from renewable sources like solar and wind energy, and both of these sources have been aggressively exploited. Another renewable source that has not been exploited to such an extent is wave energy. Apparatus is known that may be used in flowing water, such as a river or spill from a dam, and also in current induced by changes in tides, but such apparatus requires that there be continuing current in one direction. Waves do not produce such a current.

What is needed in the art is apparatus that may harness the changing motion of water in wave phenomenon.

BRIEF SUMMARY OF THE INVENTION

In one embodiment of the invention a wave driven electrical generating apparatus is provided, comprising a vertically oriented wheel having a plurality of buckets spaced around a periphery of the wheel, facing in a direction tangent to the wheel, a support structure supporting the wheel on a horizontal shaft, and a generator connected to the shaft such that motion of the wheel turns the generator. The apparatus is characterized in that the electrical generating apparatus is anchored, immersed in water in a location having wave activity, wherein the wave activity drives the wheel to create torque to drive the generator to generate electricity.

In one embodiment the wave driven electrical generating apparatus further comprises a wind driven air pump positioned above water level, pumping air through tubing into buckets on a side of the wheel where the buckets face downward, providing additional torque.

In another aspect of the invention a wave driven electrical generating apparatus is provided, comprising a vertically oriented conveyor belt structure, having a conveyor belt passing over upper and lower end rollers and a plurality of rollers spaced vertically between the inside surfaces of the belt, such that the motion of the belt turns the rollers, a plurality of elongated bucket structures each spanning a width of the conveyor belt, the bucket structures evenly spaced along a full length of the conveyor belt, such that bucket structures on one side of the conveyor belt face upward and on the opposite side of the conveyor belt face downward, drive shafts extending from the rollers on an axis of each roller in the conveyor belt structure, a first sealed cabinet with a first vertical side proximate the conveyor belt structure, the sealed cabinet having sealed opening through which the drive shafts extending from the rollers pass into the sealed cabinet, and electrical generators mounted within the sealed cabinet, the generators driven by the drive shafts through a gear mechanism. The apparatus is characterized in that the electrical generating apparatus is anchored, immersed in water in a location having wave activity, wherein the wave activity drives the conveyor belt to drive the generators to generate electricity.

In one embodiment the apparatus further comprises a second sealed cabinet on a side of the conveyor belt with drive shafts extending from the rollers into the second sealed cabinet, and generators in the second sealed cabinet driven to generate electricity by the drive shafts from the rollers extending into the second sealed cabinet. Also, in one embodiment the apparatus further comprises a wind driven air pump positioned above water level, pumping air through tubing into buckets on a side of the wheel where the buckets face downward, providing additional torque.

In yet another aspect of the invention a method for driving generators to produce electricity is provided, comprising implementing a vertically oriented conveyor belt structure, having a conveyor belt passing over upper and lower end rollers and a plurality of rollers spaced vertically between the inside surfaces of the belt, the conveyor belt having a plurality of elongated bucket structures each spanning a width of the conveyor belt, the bucket structures evenly spaced along a full length of the conveyor belt, such that bucket structures on one side of the conveyor belt face upward and on the opposite side of the conveyor belt face downward, between a first and a second sealed cabinet, extending shafts from the rollers to each side of the conveyor belt through sealed openings into the first and the second sealed cabinet, and driving generators in the first and the second sealed cabinets by the shafts through gearing to generate electricity.

In one embodiment of the method a wind driven air pump is provided above water level, pumping air through tubing to elongated bucket structures on the conveyor facing downward, providing additional torque to the rollers.

DETAILED DESCRIPTION OF THE INVENTION

Figure 1:
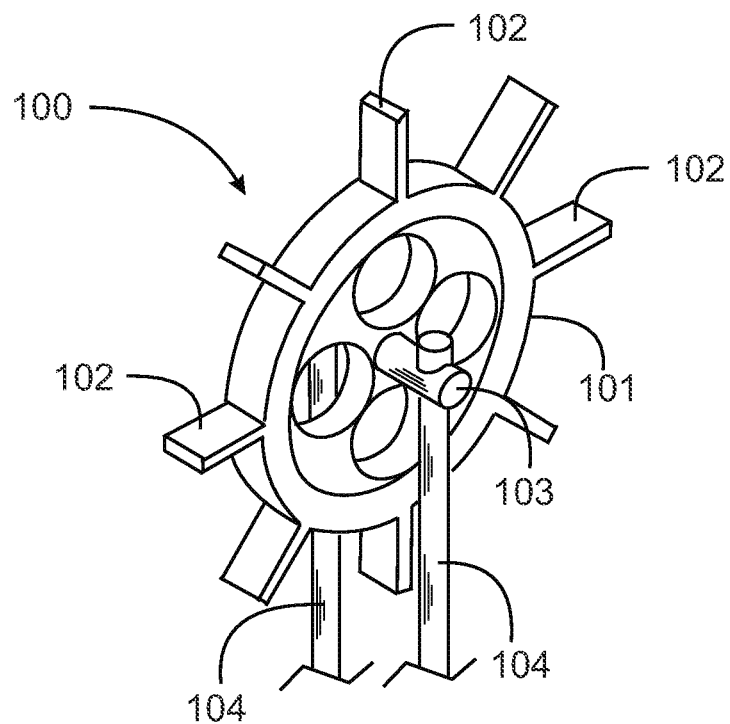
FIG. 1 is a perspective view of a wheel useful for driving a turbine in the prior art.

FIG. 1 is a perspective view of an apparatus 100 comprising a wheel 101 with extending paddles 102 useful for driving a turbine in the prior art. In this example wheel 101 turns on an axis of a shaft 103, the shaft supported by two vertical supports 104. In one implementation the wheel may be a stator and the shaft a stator of an electric generator. In another implementation shaft 103 may rotate from torque provided by the wheel and the rotating shaft may be harnessed with gearing apparatus to turn an electric generator.

It will be apparent to the skilled person that if the entire wheel with paddles is totally immersed in water, either still or in moving current, the wheel will not turn. In use such an apparatus, sometimes termed a paddle wheel, is positioned with just the paddles on a lower extremity immersed in a flowing current, which causes the wheel to rotate. Such paddle wheels are also used as mill wheels with falling water hitting the paddles on one side, turning the wheel.

Figure 2:
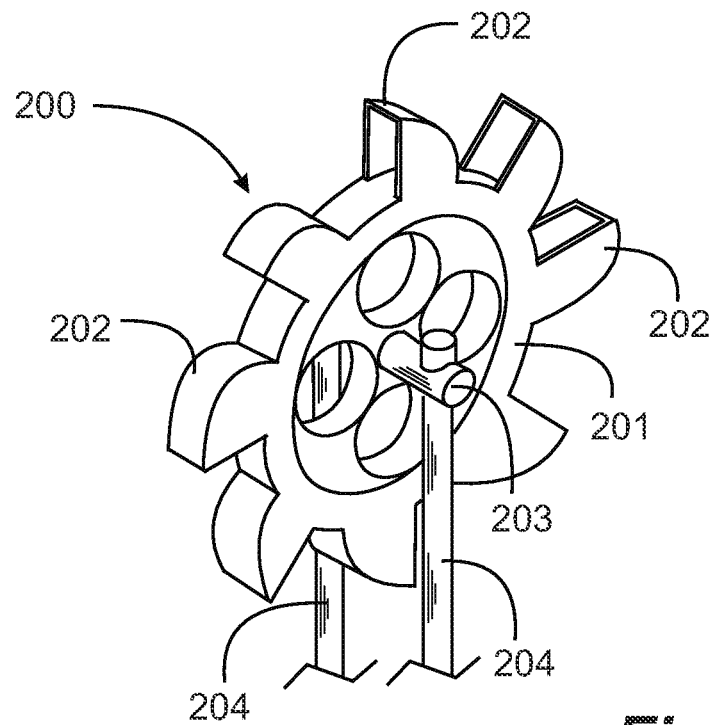
FIG. 2 is a perspective view of a wheel useful for converting wave motion in an embodiment of the invention.

FIG. 2 is a perspective view of an apparatus 200 with a wheel 201 useful for converting wave motion in an embodiment of the invention. Wheel 201 has a plurality of buckets 202 spaced around the periphery of the wheel, with open faces of the buckets facing in a direction tangent to a rim of the wheel. The wheel, as in FIG. 1, turns on a axis 203 supported by vertical supports 204 in this example.

It is well known that wave motion differs from liquid current in that the motion of a wave is repetitive upward and downward motion of the water. It may be seen that with apparatus 200 in a vertical aspect as shown, a bucket on one side of wheel 201 faces down and the corresponding bucket on the other side faces upward. It will be apparent to the skilled person that if apparatus 200 is immersed completely under water in a location where there is significant wave motion, as a wave rises the water motion will effect the buckets on one side facing down more strongly than the buckets on the other side of the wheel facing upward. Then as the wave falls the water motion will effect the buckets facing upward more strongly than the buckets facing down. So the wave motion, either rising or falling, will tend to turn the wheel in the same direction providing torque at the axis 203.

Figure 3:
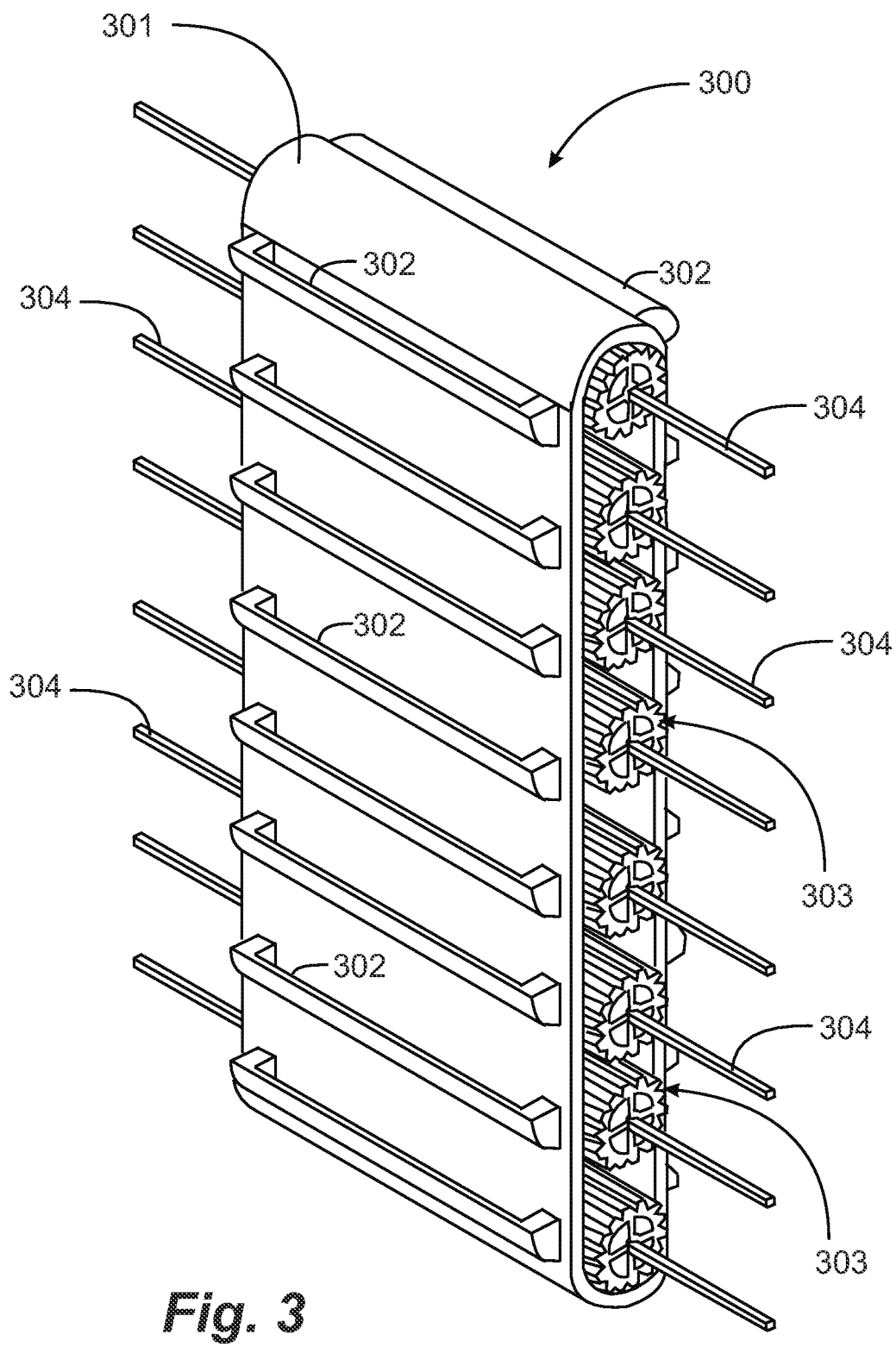
FIG. 3 is a perspective view of an apparatus based on a conveyor belt with buckets in an embodiment of the invention.

FIG. 3 is a perspective view of an apparatus 300 in in embodiment of the invention to maximize torque and efficiency in converting wave motion to rotary energy that may be harnesses to create electricity. Apparatus 300 comprises a vertically oriented conveyor belt 301 operating around a plurality of geared rollers 303 with shafts 304 extending from both ends of each gear wheel. Conveyor belt 301 has a plurality of extended buckets 302 oriented across the width of the conveyor belt and spaced along the length of the conveyor belt. The long buckets 302 are joined to the conveyor belt such that the openings to the buckets all face in the same direction, so the buckets face upward on one side of the conveyor belt and downward on the other side. This circumstance follows the purpose of apparatus 200 of FIG. 2. Immersed in water with wave action, the wave action either upward or downward will urge the conveyor belt in the same direction and turn the plurality of geared rollers 303 always in the same rotary direction, which will turn the shafts 304 all in the same rotary direction. Shafts 304 may be used to drive generators through geared mechanisms not shown to produce electricity.

Figure 4:
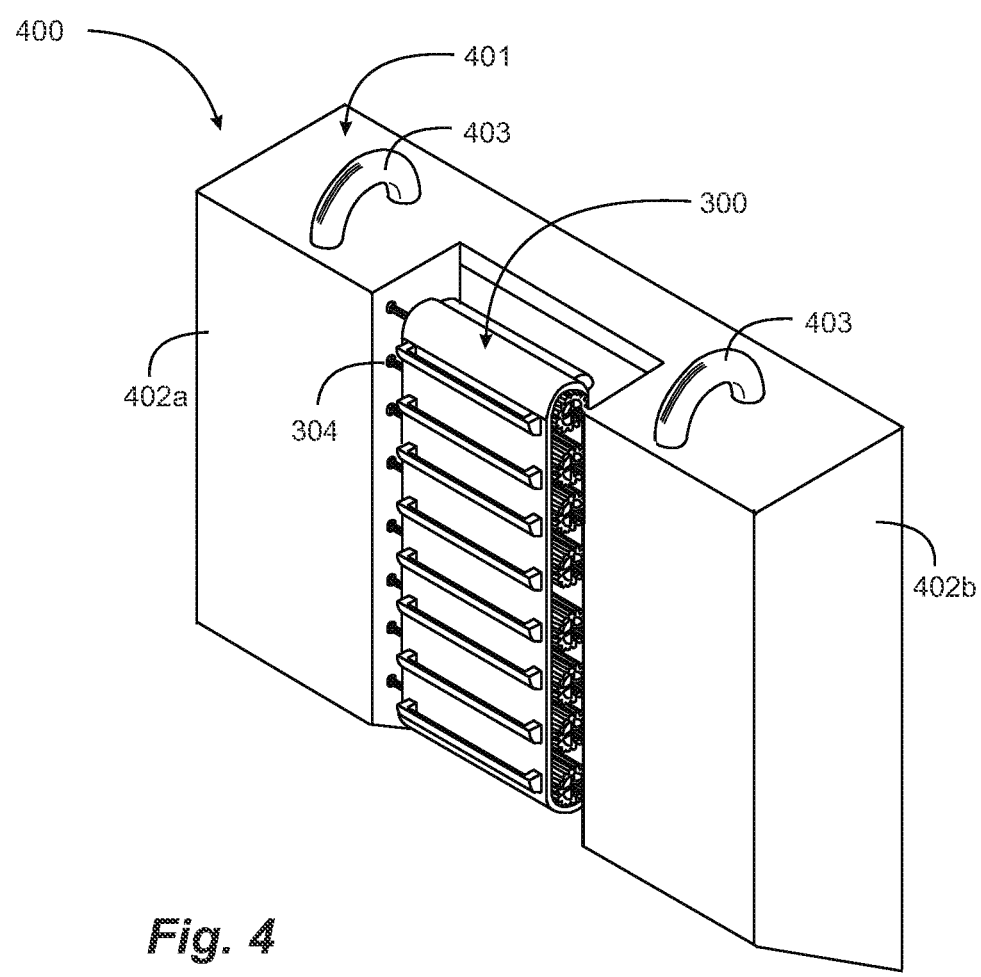
FIG. 4 is a perspective view of a self-contained wave energy generating unit in an embodiment of the invention.

FIG. 4 is a perspective view of a self-contained wave energy generating unit 400 in an embodiment of the invention. Unit 400 has a sealed cabinet 401 with two opposite portions 402*a* and 402*b* and a conveyor belt apparatus 300 integrated between the opposite portions of the cabinets. Shafts 304 from each end of each of the gear units within the conveyor belt pass into portions 402*a* and 402*b* through sealed openings and connect within the sealed housings to electrical generators (not shown). Hooks 403 are for lifting and placing generating unit 400 to be immersed. Waves operate on the buckets of the conveyor belt, turning the gear wheels which turn generators, which may be through a gear train, and electricity is generated. Wiring carrying generated current from the generating unit 400 is not shown.

Figure 5:
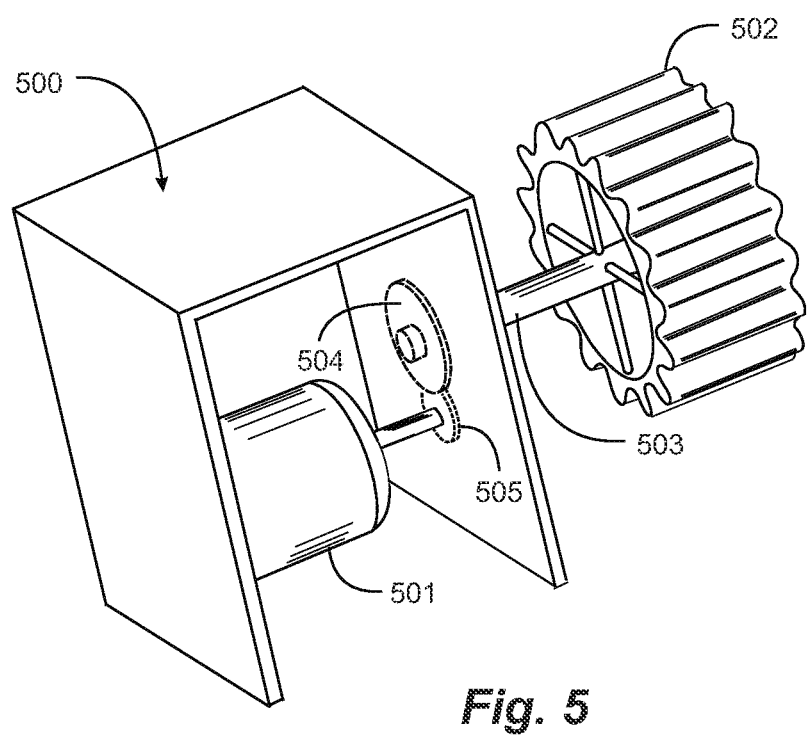
FIG. 5 is a perspective cutaway view illustrating gearing through which a generator is driven in an embodiment of the invention.

FIG. 5 is a partially cutaway view of an enclosure 500 which represents one portion of enclosure 401 of FIG. 4. One generator 501 with shaft is shown in the enclosure connected to a gear 505 driven by a larger gear 504 that is driven through a sealed opening by shaft 503 by one roller 502. Roller 502 represents one roller 303 as shown in FIG. 2 in conveyor belt 301. Shaft 503 in FIG. 5 represents one shaft 304 from FIG. 3 and FIG. 4. As wave motion drives conveyor belt 301 shaft 503 turns gear 504 that turns gear 505 that drives the generator. In the finished unit a plurality of rollers 303 drive a plurality of generators on both sides of the conveyor belt.

Figure 6:
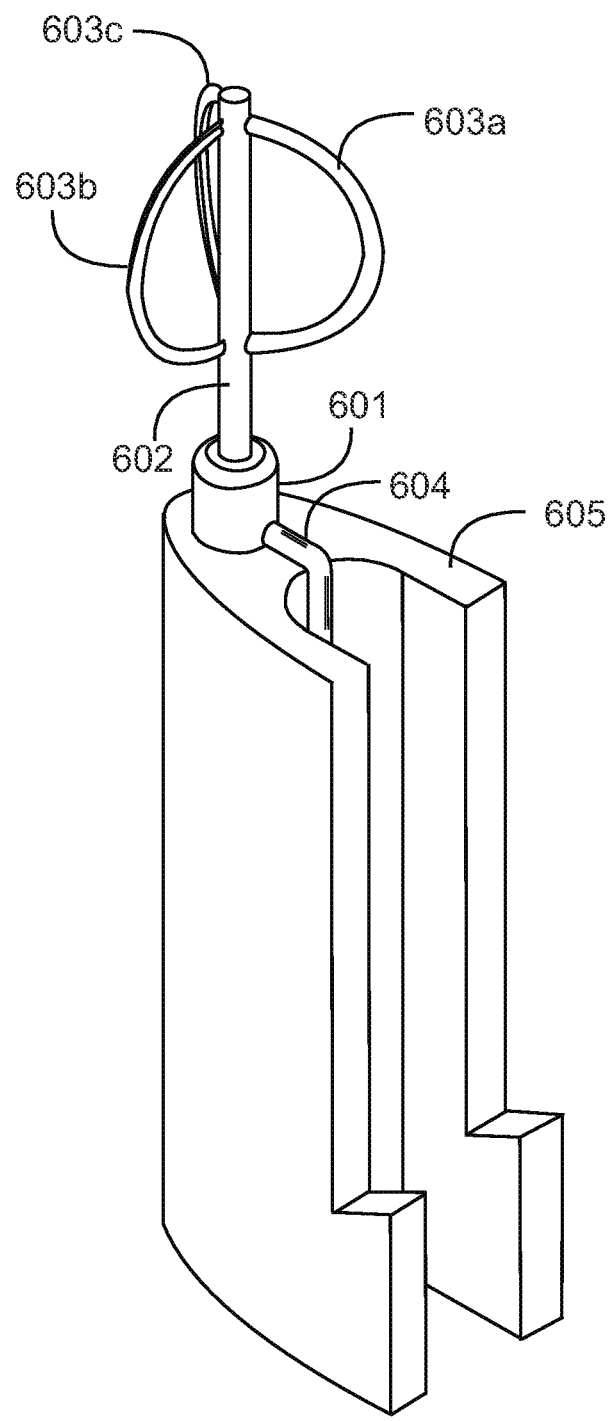
FIG. 6 is a perspective view of a wind driven air pump providing air to drive a conveyor in an embodiment of the invention.

In operation there is thought to be a small time period wherein the motion of the water transitions from downward to upward in a wave. The inventor has provided an addition driving force that helps the conveyor to keep moving during this short period. FIG. 6 illustrates a wind driven air pump 601 having a shaft 602 with wind vanes 603*a*, 603*b* and 603*c*. Wind turns shaft 602 and the air pump delivers air via a line 604 to a distribution lines proximate conveyor 300. The distribution lines deliver the air into the extended buckets 302 on the side of the conveyor where the buckets face downward. The air provides a motive force to the buckets to help drive the conveyor. Structure 605 represents structure connecting to sealed cabinet 401.

The skilled person will understand that the embodiment illustrated and described above are exemplary only and not limiting to the scope of the invention. There are many alterations that may be made in the embodiments described within the scope of the invention. The scope of the invention is limited only by the claims.

The invention claimed is:

1. A wave driven electrical generating apparatus, comprising:
   a vertically oriented wheel having a plurality of buckets spaced around a periphery of the wheel, facing in a direction tangent to the wheel;
   a support structure supporting the wheel on a horizontal shaft; and
   a generator connected to the shaft such that motion of the wheel turns the generator; and
   a wind-driven air pump positioned above water level pumping air through tubing into buckets on a side of the Wheel where the buckets face downward, providing additional torque;
   characterized in that the electrical generating apparatus is anchored, immersed in water in a location having wave activity, wherein the wave activity drives the wheel to create torque to drive the generator to generate electricity.

2. A wave driven electrical generating apparatus, comprising:
   a vertically oriented conveyor belt structure, having a conveyor belt passing over upper and lower end rollers and a plurality of rollers spaced vertically between the inside surfaces of the belt, such that the motion of the belt turns the rollers;
   a plurality of elongated bucket structures each spanning a width of the conveyor belt, the bucket structures evenly spaced along a full length of the conveyor belt, such that bucket structures on one side of the conveyor belt face upward and on the opposite side of the conveyor belt face downward;

drive shafts extending from the rollers on an axis of each roller in the conveyor belt structure;

a first sealed cabinet with a first vertical side proximate the conveyor belt structure, the sealed cabinet having sealed opening through which the drive shafts extending from the rollers pass into the sealed cabinet;

electrical generators mounted within the sealed cabinet, the generators driven by the drive shafts through a gear mechanism;

characterized in that the electrical generating apparatus is anchored, immersed in water in a location having wave activity, wherein the wave activity drives the conveyor belt to drive the generators to generate electricity.

3. A wave driven electrical generating apparatus of claim 2 further comprising a second sealed cabinet on a side of the conveyor belt with drive shafts extending from the rollers into the second sealed cabinet, and generators in the second sealed cabinet driven to generate electricity by the drive shafts from the rollers extending into the second sealed cabinet.

4. The wave driven electrical generating apparatus of claim 3 further comprising a wind driven air pump positioned above water level, pumping air through tubing into buckets on a side of the wheel where the buckets face downward, providing additional torque.

5. A method for driving a generator to produce electricity, comprising:

implementing a vertically oriented conveyor belt structure, having a conveyor belt passing over upper and lower end rollers and a plurality of rollers spaced vertically between the inside surfaces of the belt, the conveyor belt having a plurality of elongated bucket structures each spanning a width of the conveyor belt, the bucket structures evenly spaced along a full length of the conveyor belt, such that bucket structures on one side of the conveyor belt face upward and on the opposite side of the conveyor belt face downward, between a first and a second sealed cabinet;

extending shafts from the rollers to each side of the conveyor belt through sealed openings into the first and the second sealed cabinet;

driving generators in the first and the second sealed cabinets by the shafts through gearing to generate electricity.

6. The method of claim 5 wherein a wind driven air pump is provided above water level, pumping air through tubing to elongated bucket structures on the conveyor facing downward, providing additional torque to the rollers.

\* \* \* \* \*